C. J. GILBERT.
LENS HOLDER FOR LENS CENTERING, MARKING, AND TESTING MACHINES.
APPLICATION FILED JULY 10, 1916.
1,320,542.
Patented Nov. 4, 1919.
2 SHEETS—SHEET 1.
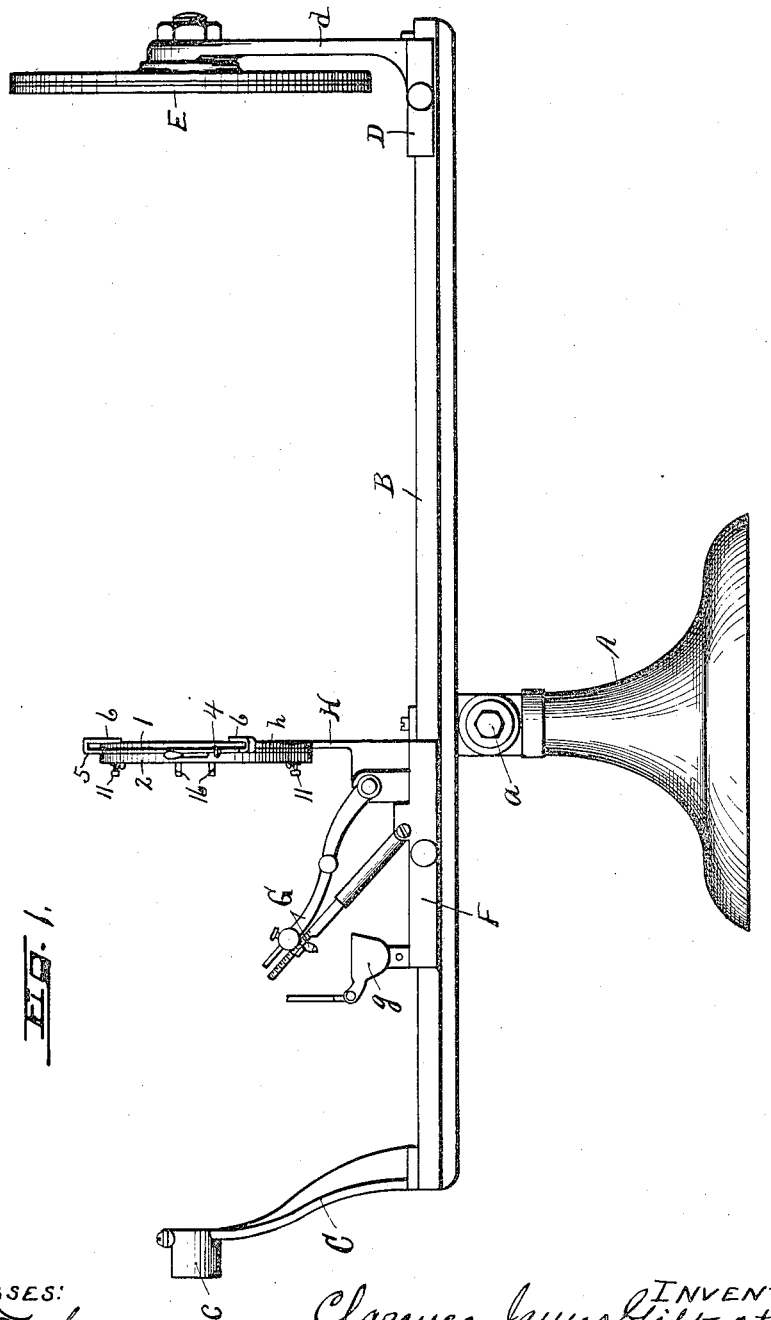

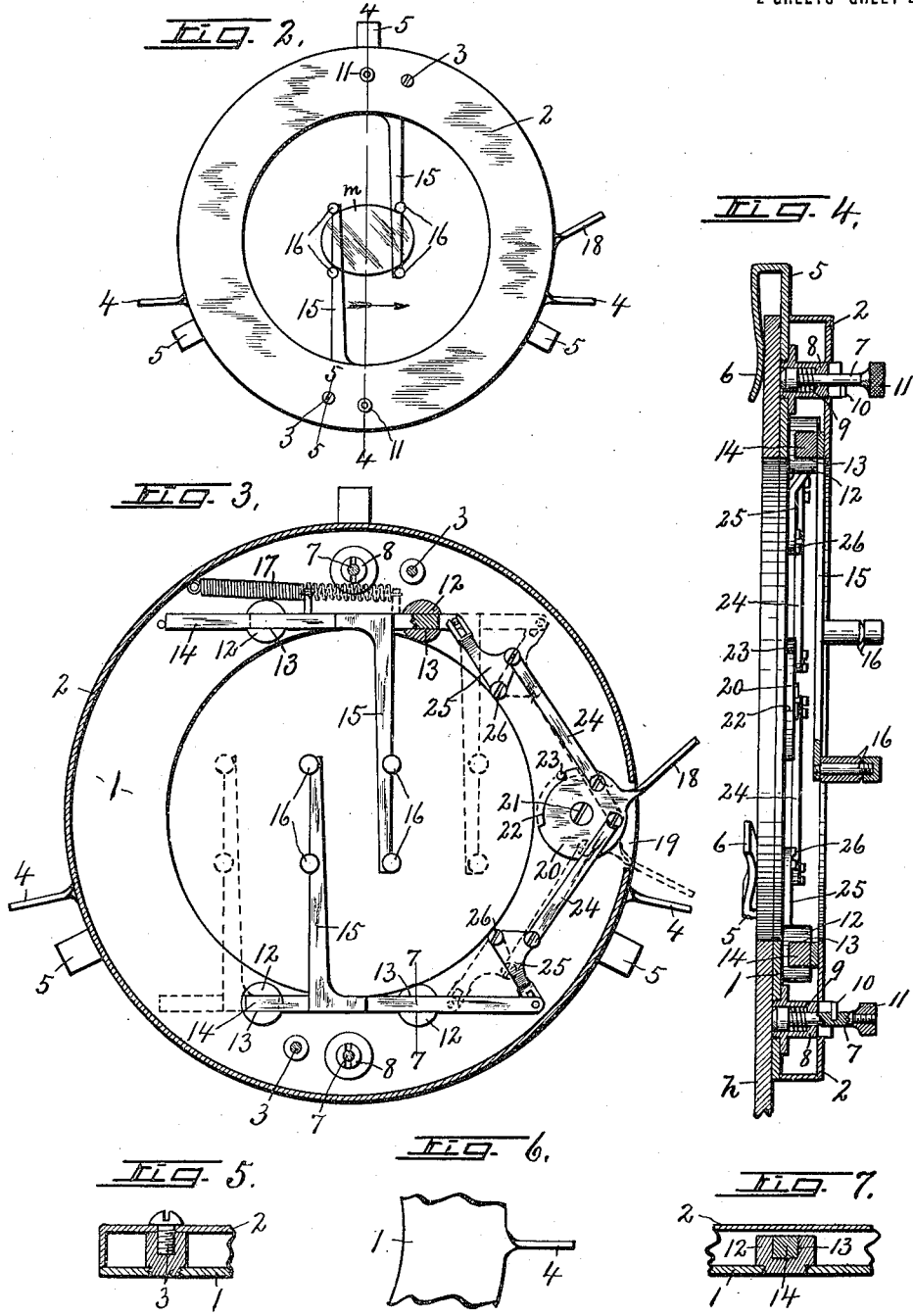

UNITED STATES PATENT OFFICE.

CLARENCE JAMES GILBERT, OF GENEVA, NEW YORK, ASSIGNOR TO THE STANDARD OPTICAL COMPANY, OF GENEVA, NEW YORK, A CORPORATION OF NEW YORK.

LENS-HOLDER FOR LENS CENTERING, MARKING, AND TESTING MACHINES.

1,320,542.   Specification of Letters Patent.   Patented Nov. 4, 1919.

Application filed July 10, 1916. Serial No. 108,389.

*To all whom it may concern:*

Be it known that I, CLARENCE JAMES GILBERT, a citizen of the United States of America, and resident of Geneva, in the county of Ontario, in the State of New York, have invented new and useful Improvements in Lens-Holders for Lens Centering, Marking, and Testing Machines, of which the following, taken in connection with the accompanying drawings, is a full, clear, and exact description.

This invention relates to certain improvements in lens-holders adapted to be used in connection with lens-centering, marking and testing instruments of the class set forth in the patent to Bader and Howland, No. 1,134,938, issued April 6, 1915, and also in the pending application of C. W. Howland, filed December 14, 1915, Serial No. 66,736, in that it provides means for holding a lens in the produced axis of the target and sight-tube and for the adjustment of the lens rotarily and radially relatively to said axis for testing and marking purposes.

The main object is to increase the general working efficiency of devices of this character, and at the same time to reduce the cost of manufacture by reducing the number of parts, and otherwise simplying the structure and work of assembling.

Another object is to render the movement of the lens-clamping jaws more convenient and expeditious.

Other objects and uses relating to specific parts of the device will be brought out in the following description.

In the drawings—

Figure 1 is a side elevation of a lens-centering, testing and marking instrument with my improved lens-holder embodied therein.

Fig. 2 is a face view of the detached lens-holder.

Fig. 3 is an enlarged face view of the base plate and various operating parts mounted thereon, the cover plate being shown in section.

Fig. 4 is an enlarged transverse sectional view taken on line 4—4, Fig. 2.

Fig. 5 is an enlarged detail sectional view taken on line 5—5, Fig. 2.

Fig. 6 is a face view of a portion of the base plate, showing one of the finger-pieces thereon for turning the same.

Fig. 7 is a detail sectional view taken on line 7—7, Fig. 3.

In order that my invention may be clearly understood, I have shown it in connection with a lens-centering, marking and testing device comprising a base —A— for supporting a horizontal bed or table —B—, which is hinged thereto at —a— to tilt vertically, and is provided at one end with a bracket —C—, carrying a sight-tube —c—, and at its opposite end a sliding block —D— having an upwardly projecting arm —d— upon which is mounted a target —E— coaxial with the sight-tube —c—.

A carriage —F— is slidably mounted upon the intermediate portion of the bed or table —B— for supporting a suitable marking device —G— and container —g— for an ink-pad, not shown, said carriage being also provided with an upwardly projecting bracket —H— carrying a suitable ring or circular plate —h— which is provided with a sight-opening therethrough coaxial with the target —E— and sight-tube —c— and is adapted to support the lens-holder forming the subject-matter of my present invention.

This lens-holder comprises a circular base plate or ring —1— carrying the various movable parts of the holder and a cover —2— for inclosing and protecting said working parts, the cover being secured to the base plate by suitable fastening means, as screws —3—, shown more clearly in Fig. 5.

The base plate or ring —1— and cover plate —2— are preferably made of sheet metal for lightness and economy of manufacture and are provided with central circular sight-openings, normally coaxial with the axis of the target —E— and sight-tube —c— to afford an unobstructed view from the sight-tube to the target in centering or testing a lens in the holder.

These two parts —1— and —2— constitute what may be termed a hollow ring, or housing, the cover —2— being provided with a radial peripheral flange of uniform width and suitable depth having its edge resting against the front face of the base plate —1— to afford sufficient space for the reception and operation of the lens-clamping jaws and operating mechanism therefor.

The holder as a whole is adjustable by hand rotarily and radially in all directions upon the supporting plate or frame —h—, and for this purpose the base plate or ring —1— is provided with finger-pieces —4— projecting radially from the outer opposite edges thereof, and preferably integral therewith, said plate or ring —1— being located in close proximity to the front face of the supporting ring —h—, and is provided with a series of, in this instance three, radially projecting arms —5— extending some distance beyond the outer edge of the adjacent portions of the frame —h— and provided with spring-fingers —6— returned across the rear face of said frame for frictional contact therewith to retain the lens-holder in any position of adjustment, said lense-holder being also provided with a plurality of, in this instance two, diametrically opposite plungers —7— operating in suitable guides —8— on the base plate —1— for frictional engagement with the front face of the supporting frame —h— to aid in frictionally retaining the lens-holder in its adjusted position.

These plungers are actuated against the supporting frame —h— by coil springs —9— and are provided near their outer ends with radial pins —10— adapted to be turned into engagement with the outer ends of the guides —8— when withdrawn against the action of the spring to hold them out of engagement with the supporting frame —h—, thereby permitting the entire lens-holder to be adjusted freely to its axis or radially thereto, the plungers —7— and guides —8— being extended forwardly through suitable openings in the front side of the cover —2— and some distance beyond the same, the outer ends of the plungers being provided with knobs or hand-pieces —11— by which they may be operated.

The base plate or ring —1— of the lens holder is provided with diametrically opposite pairs of forwardly projecting bosses —12— having transversely extending guideways or slots —13—, those of each pair being alined with each other in parallelism tangential to the ring 1 for receiving and guiding a pair of diametrically opposite tangentially sliding bars —14— which are held in place against forward displacement by the cover —2— covering the outer open ends of the slots —13—.

These bars —14— are provided with suitable jaws —15— at substantially right angles thereto partially across the intervening opening and beyond the center thereof in spaced relation so as to move toward and from each other as the jaws —15— are reciprocated in a manner hereinafter described, the inner ends of said jaws being provided with separate pairs of pins —16— located equally distant from the center of the base plate —1— and projecting forwardly through the central opening in the cover —2— and beyond the front face thereof for engaging the ends of a lens and centering the same with reference to the center of the base plate or ring —1—.

These jaws are adapted to be operated simultaneously in reverse directions against the action of a retracting spring —17— by suitable hand-operated means consisting, in this instance, of a hand-lever —18— working in a radial slot —19— in the outer edge of the cover —2— and having its inner end made in the form of a flat disk —20— pivoted at —21— to the base plate or ring —1— and provided in its periphery with a circumferentially extending recess —22— coöperating with a stop pin —23— for limiting its rotary movement.

The disk —21— is connected by oppositely projecting links —24— to the short arms of suitable bell-crank levers —25— which are pivoted at —26— to the base plate or ring —1— and have their long arms slotted for pivotal connection with the adjacent ends of the sliding bars —14—, as shown more clearly in Fig. 3, the connections between the lever —18— and sliding bars —14— being adjusted so as to move the bars equal distances in reverse directions.

The finger-piece of the lever —18— extends some distance beyond the adjacent edge of the lens holder or base plate —1— and within easy reaching distance of the adjacent finger piece —4— so that when it is desired to open the jaws —15—, the thumb may be placed against the finger-piece —4— and the forefinger upon the finger-piece of the lever —18— which is a very convenient means for operating the jaws against the action of the retracting spring with one hand, while the other hand is employed in placing the lens in position to be engaged by the pins —16—.

By frictionally retaining the lens-holder on the frame in the manner described, it may be shifted or adjusted by hand circumferentially or radially and automatically held in any of its adjusted positions.

*Operation.*

In placing a lens —m— in the holder preparatory to centering, marking or testing, it is simply necessary to depress the lever —18—, thereby opening the jaws —15— against the action of the retracting spring —17—, whereupon the lens may be placed between the pins —16— and the pressure upon the lever —18— released, thus permitting the spring to retract the jaws into operative engagement with the edge of the lens for holding the same coaxial with the axis of the supporting base plate or ring —1— which, together with the other parts of the holder mounted thereon may be adjusted rotarily or radially to properly adjust the lens with reference to the axis of the target for purposes of reading the angle or position of the optical axis, and also for marking purposes, it being understood that the holder and its supporting frame may be properly graduated if desired to indicate the degree of such rotary or radial adjustment.

What I claim is:

A lens-holder for centering, marking and testing instruments comprising in combination with an upright substantially circular supporting frame disposed at right angles to the line of sight and provided with a central opening therethrough, a ring adjustable rotarily and radially upon the frame, guides mounted on diametrically opposite sides of the ring, lens-clamping jaws movable in said guides, bell-crank levers operatively connected to the jaws, a hand-lever pivoted to the ring, links connecting the hand-lever to the bell-crank levers for operating the jaws in opposite directions as the lever is moved in one direction, and retracting means for the jaws.

In witness whereof I have hereunto set my hand this 6th day of July, 1916.

CLARENCE JAMES GILBERT.

Witnesses:
ALBION W. NEWELL,
L. B. COLEMAN.

Copies of this patent may be obtained for five cents each, by addressing the "Commissioner of Patents, Washington, D. C."